(12) United States Patent
Ejaz et al.

(10) Patent No.: US 7,388,174 B2
(45) Date of Patent: Jun. 17, 2008

(54) STARCH-REDUCING RICE COOKER

(76) Inventors: Salim Ejaz, 97 Sterling Ct., Muttontown, NY (US) 11791; Murad Pandit, 13150 Holly Loch La., Highland, MD (US) 20777; Omar Khan, 6510 Windsor Park, Beaumont, TX (US) 77706

( * ) Notice: Subject to any disclaimer, the term of this patent is extended or adjusted under 35 U.S.C. 154(b) by 1001 days.

(21) Appl. No.: 10/729,744

(22) Filed: Dec. 5, 2003

(65) Prior Publication Data

US 2005/0120887 A1   Jun. 9, 2005

(51) Int. Cl.
*A23L 1/01*   (2006.01)
*A23L 1/182*  (2006.01)
*A47J 27/10*  (2006.01)
*A47J 27/62*  (2006.01)

(52) U.S. Cl. .................. 219/429; 219/430; 219/432; 99/330

(58) Field of Classification Search ............. None
See application file for complete search history.

(56) References Cited

U.S. PATENT DOCUMENTS 5,586,487 A * 12/1996 Marino ................. 99/330

* cited by examiner

*Primary Examiner*—J. Pelham
(74) *Attorney, Agent, or Firm*—Alfred M. Walker

(57) ABSTRACT

A starch-reducing rice cooker includes a pot containing a lower compartment and an upper boiling chamber having a top opening. A partition separates the lower compartment from the upper boiling chamber. A perforated basket is located within the upper boiling chamber for containing rice to be cooked, and is adapted to contain more than sufficient water to immerse the rice for cooking. A cover is provided. In one embodiment, the cover is also provided with a top opening having a sprayer, spraying cool rinsing water onto the rice within the basket, after cooking of the rice is complete. A discharge valve within the partition communicates between the upper boiling water chamber and the lower compartment. A detector is programmed to detect when boiling of water in the upper boiling temperature starts and to maintain boiling for a time required to properly cook the rice based upon the boiling temperature of the water. The discharge valve is activated after cooking is completed for discharging water through the discharge valve from the upper boiling chamber into the lower compartment, thereby reducing the starch content of the cooked rice.

31 Claims, 7 Drawing Sheets

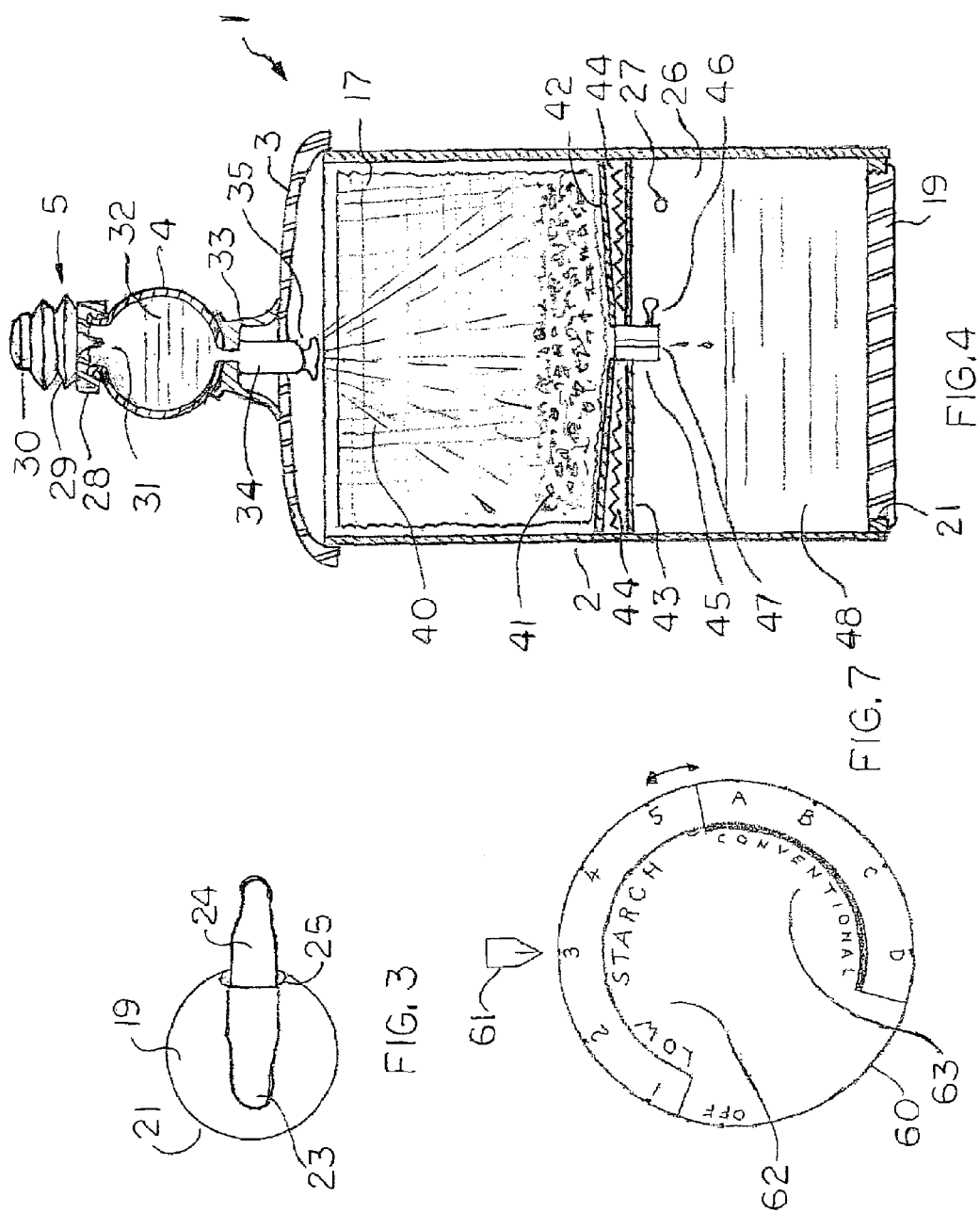

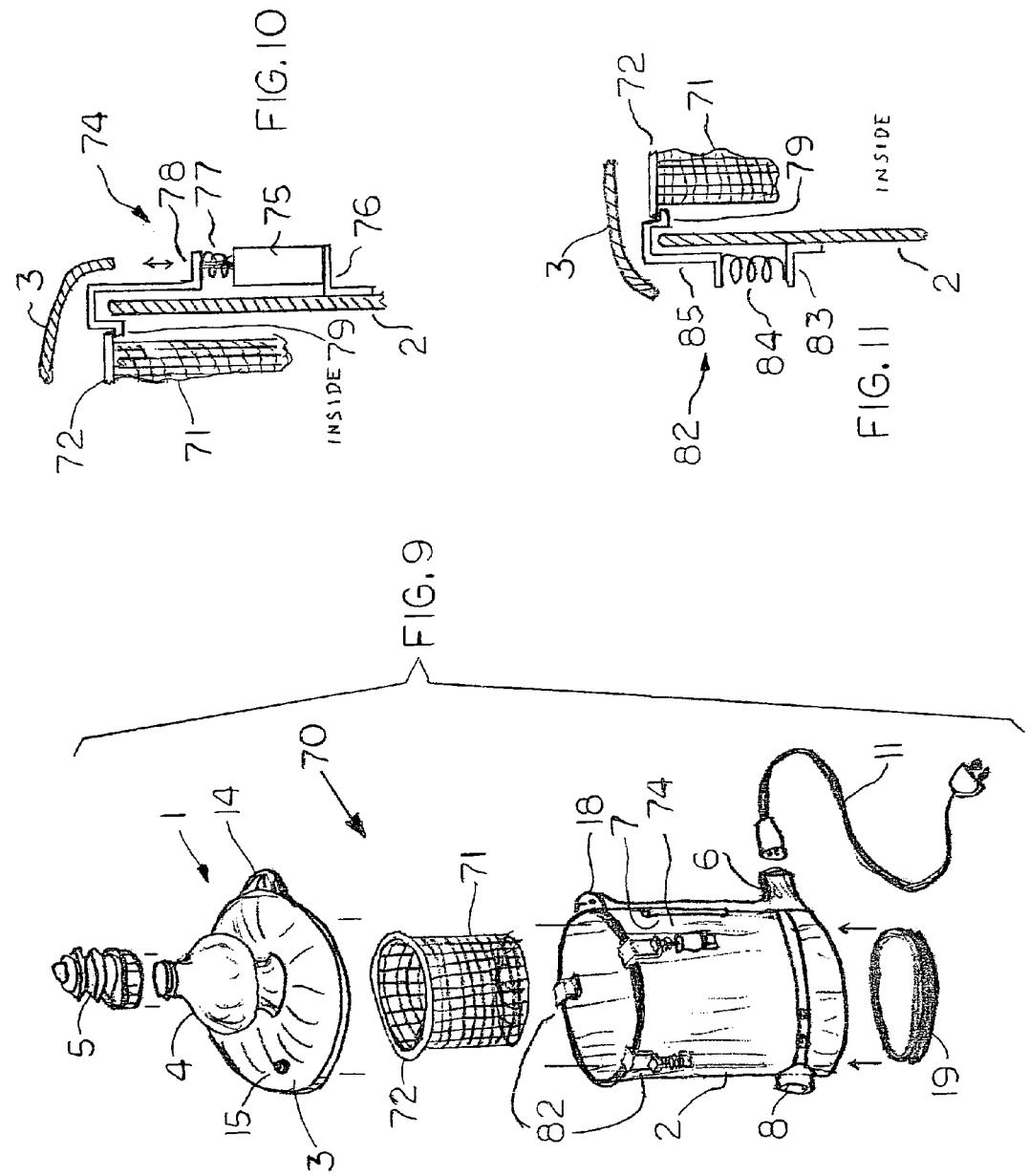

STARCH-REDUCING RICE COOKER

FIELD OF THE INVENTION

The present invention relates to starch reducing rice cooker machines.

BACKGROUND OF THE INVENTION

Rice is an important food in many cultures, and it is a source of many nutrients. Unfortunately, it has a high starch content. The most popular method of cooking rice is to combine the dry rice with a proportioned amount of water such that the water will be totally absorbed during the cooking process. This is the technique used by most cooks using manual methods or electric rice cookers.

Some cooks use a variety of preparation methods to actively reduce the amount of starch in the cooked rice. Soaking or rinsing prior to cooking and discarding the water is somewhat effective. Most effective is the method of cooking the rice with an excess of water, then discarding the "starch" water, sprinkling clean cold water to rinse the rice, draining this water, and then reheating the rice.

SUMMARY OF THE INVENTION

This invention takes the most effective manual method of preparing reduced-starch cooked rice, and creates an automatic electric rice cooker based on the manual method, while insuring guaranteed success without the need for an experienced cook. The cooker is available in a variety of sizes.

Using a cooking pot, optionally aluminum or stainless steel, with a wire mesh or perforated metal rice basket within, there is also a separate lower compartment to receive the starch water at the appropriate time in the cooking cycle. A separate reservoir of cool rinsing water is pressurized prior to cooking, and a spray of this water is used to rinse the rice after the starch water is drained. This water too is drained into the lower reservoir. The electric heaters are then turned on a low setting to reheat the cooked rice and evaporate or absorb any surface water on the rice grains.

All of the cooking steps may be controlled by a microcomputer with a clock module. A "ready" indicator may be turned on at the end of the cooking process. The rinse water reservoir may be attached to the pot cover. It is pressurized by a plastic bellow, which may be incorporated into a screw top which is pushed down several times manually, prior to the start of the cooking cycle. The steps of draining the starch and spraying of the rinse water may be accomplished by solenoid valves, timed and controlled by a microcomputer chip While it can be appreciated that the length of time to commence boiling is a function of the water initial temperature, heater power, amount of water used, and altitude, once water starts boiling, its temperature is essentially constant. This fact is used by the rice cooker of this invention to detect the point at which boiling starts. A temperature detector may be employed for such a step and immersed into the water for periodic sampling; the reading is compared to the previous reading. The start of boiling is noted when the reading is the same as the previous reading. Another factor is altitude, which affects the boiling temperature of the water and hence the boiling time required to cook the rice. Again, the temperature sensor may be used as an input to an algorithm programmed into the microcomputer which adjusts the required boiling time as required by the actual boiling temperature of the water. Another input to the algorithm may be a dial setting which is adjusted by the consumer prior to starting the cooker. As described in the owner's manual, the correct setting is based primarily on the type of rice being cooked; in some cases a setting is also affected somewhat by the amount of rice being prepared and by customer preference.

Since starch water is a sticky substance, a very large screw lid may be used on the bottom of the rice cooker to gain access to the lower compartment for cleaning. A means of facilitating opening and closing of the lid, optionally comprising a gasket, may be a recessed handle, which is swung open to give the consumer leverage. This lower compartment may be a material such as stainless steel or aluminum and optionally covered with a non-stick coating. A temperature resistant plastic resin may also be used. Another item that must be cleaned after each use is the solenoid valve that communicates with this compartment. To facilitate cleaning of the solenoid valve orifice, a manual override lever accessible from the bottom may be used to open the valve during cleaning.

In an alternate embodiment, the rice cooker of this invention is enhanced to do double duty as a conventional rice cooker, skipping the starch reducing steps if so desired by the user. In the conventional method, a lower relative amount of water is used which is totally absorbed by the rice during cooking. This mode is set by the user by turning the control dial to a "conventional" sector which has settings for variations of rice type or amount as in the low starch method. The control computer detects the mode and truncates the process after the rice is cooked. The algorithm for calculating cooking time is similar to that for the low starch method, but the time factors based on the dial setting are different. The conventional mode still takes advantage of the advanced features of this rice cooker in detecting the onset of boiling and adjusting the cooking time to the actual temperature of the boiling water.

In yet another second alternate embodiment, an agitation feature is added which agitates the rice basket during and after the spray washing step. This helps the rice to remain separated and to drain excess spray water more efficiently. This is accomplished by adding an electrically operated agitator such as a voice-coil actuator which couples to a rim added to the top edge of the rice basket.

BRIEF DESCRIPTION OF THE DRAWINGS

The present invention can best be understood in connection with the accompanying drawings. It is noted that the invention is not limited to the precise embodiments shown in drawings, in which:

FIG. 3 is a Bottom view of a lid for the bottom compartment with leverage handle extended;

FIG. 4 is a Side crossectional view of the rice cooker in operation;

FIG. 7 is a Front view of dial with a "conventional mode" sector as part of an alternate embodiment of this invention;

FIG. 9 is a Perspective exploded view showing modifications and additional parts to incorporate agitation of the rice basket as dictated by the second alternate embodiment of this invention;

FIG. 10 is a Side view detail showing attachment of agitator to rice cooker housing;

FIG. 11 is a Side view detail showing passive spring support for rice basket; and, FIG. 12 is a Flow chart of rice cooker showing process modification incorporating the agitation feature.

DETAILED DESCRIPTION OF THE INVENTION

Figure 1:
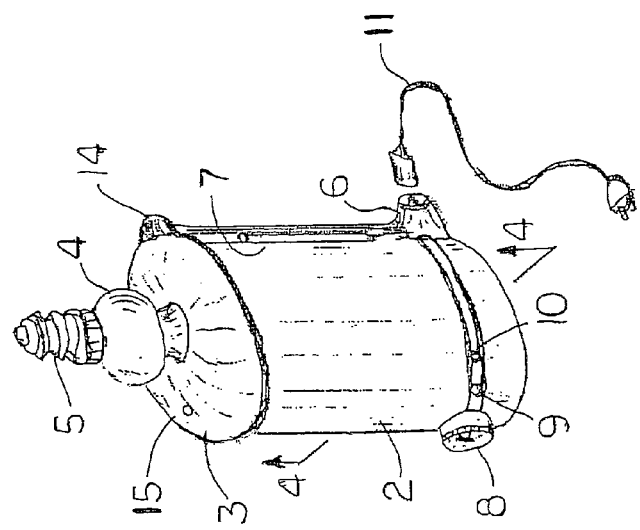
FIG. 1 is a Perspective view of the rice cooker of this invention.

Rice cooker 1 of this invention is shown in FIG. 1 with pot housing 2, cover 3, rinse water reservoir 4, bellows compressor 5, setting dial 8, and combination electrical connector and electronics housing 6. A vent hole 15 on cover 3 prevents internal pressure build-up. External vent tube 7 vents the lower internal compartment. Cover 3 extension 14 has an electrical connector which mates with a connector supplying power and control to the spray solenoid valve. A sensory perceptible indicator display, such as, for example, a green light emitting diode (LED) 9, indicates that cooking is in process, while another sensory perceptible display, such as, for example, red LED 10, indicates that cooking is completed. Audio sound producing indicators (not shown) may be used in conjunction with visually perceptible indicators, such as LED 9 and LED 10, or in combination therewith. Line cord 11 is detachable at rice cooker 1 so as to permit total water immersion during cleaning. All electronics in housing 6 is potted for safe immersibility. Connector 18 mates with cover connector 14.

Figure 2:
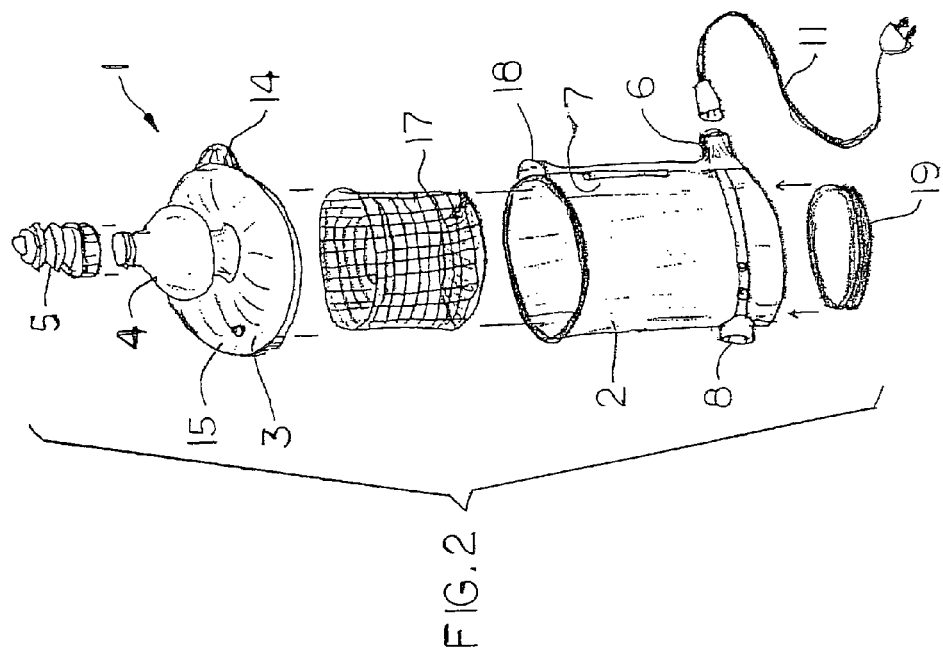
FIG. 2 is a Perspective exploded view of all of the consumer-contact components of the rice cooker.

The exploded view of FIG. 2 shows rice basket 17 which may comprise wire mesh or perforated metal sheet. A lid cover, such as screw lid 19 sealing the starch water reservoir, is shown at the bottom.

FIG. 3 shows a bottom view of lid 19 with screw threads 21 at the periphery of said lid 19. Leverage handle 24 is shown in deployed position; it can be folded down at hinge 25 into locking recess 23 after it is attached to cooker 1.

Cooker 1 is shown in cross-section in FIG. 4. The interior of pot housing 2 is partitioned into two major compartments by the heating assembly. Heater elements 44 are sandwiched between sloping floor 42 of the boiling chamber and ceiling 43 of the vented starch water reservoir 26 with vent hole 27 communicating to ambient air via vent tube 7. Rice 41 is held within basket 17, and starch water 48 has drained from the upper compartment through orifice 47 of solenoid valve 45 with manual override lever 46. A compressor 5 is formed from inlet check valve 30, plastic bellows 29, and outlet check valve 31, all being attached to screw top 28. Spray water 32 container 4 may comprise transparent plastic or glass; it is attached to cover 3 via base connector 33. Note that spray water 32 enters spray solenoid valve 34 and is discharged under pressure through nozzle 35 as coarse spray 40.

Figure 5:
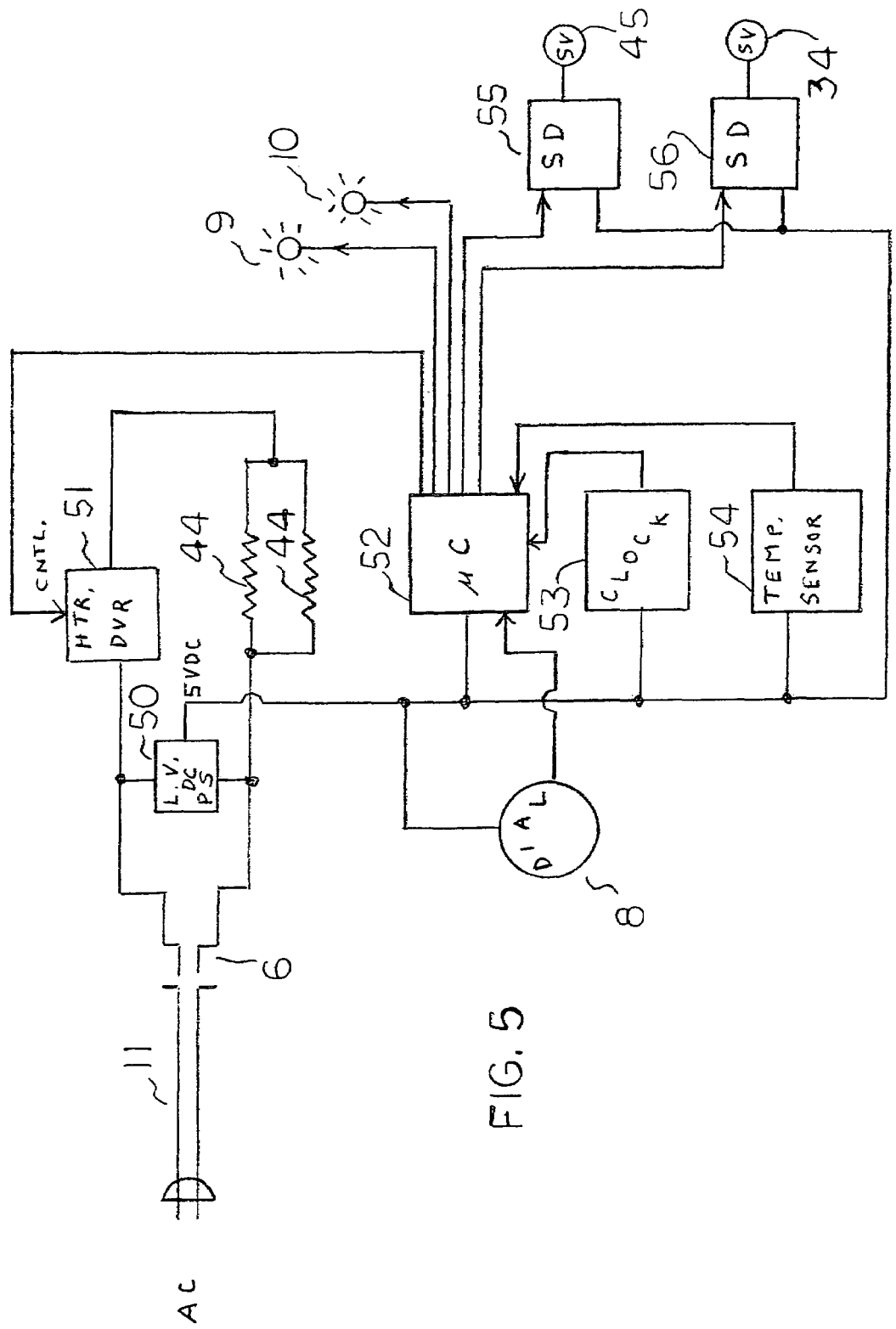
FIG. 5 is an Electrical block diagram of rice cooker.

A block diagram of electrical hardware is shown in FIG. 5. Connector 11 brings AC mains power to rice cooker 1 through connector 6. Low voltage AC/DC power supply 50 supplies DC power to all of the control electronics including microcomputer 52, clock module 53 (may be part of 52), temperature sensor 54 and solenoid drivers 55 and 56. Heater driver 51 is a solid-state relay which supplies high voltage AC to one or more heaters 44 via control from computer 52. Dial 8 is a manually set analog or digital control which inputs its setting to computer 52. Displays 9 and 10, which may be LEDs, are controlled by computer 52 as are solenoid drivers 55 and 56 which drive solenoid valves 46 and 35 respectively.

Figure 6:
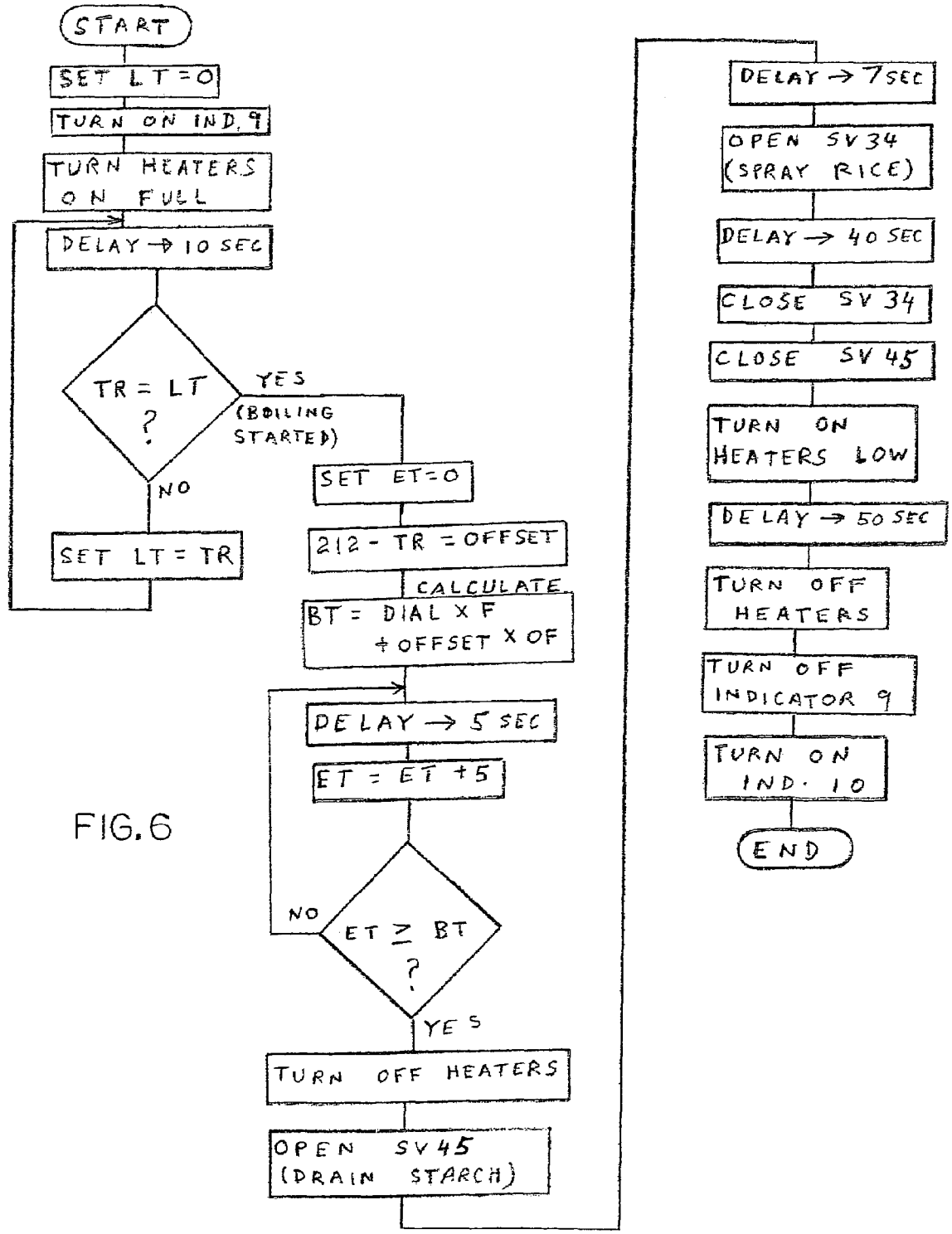
FIG. 6 is a Flow chart of the automated cycle of the rice cooker of this invention.

The automated process by which rice is cooked by rice cooker 1 is detailed by the flow chart of FIG. 6. Measured data is "burned into" non-volatile read-only storage on board computer 52 as the control program. The procedure starts by setting the last temperature register (LT) to zero, turning on green LED 9, and turning on heaters 44 on continuously (fully on). (Throughout the flow chart, exact numbers of seconds are used. It can be appreciated that these are typical examples, and that the final numbers in a commercial rice cooker of this design may differ.) After a delay, preferably about 10 seconds, a temperature reading (TR) is read from the temperature sensor and compared with LT. If they differ, TR replaces LT and we wait another 10 seconds. This goes on until boiling is detected by virtue of TR=LT within a small error range. At this point, the elapsed time register (ET) is set to zero, an offset may be computed as approximately 212-TR, and the boiling time (BT) may be calculated as a function of the dial setting multiplied by a factor and adding the product of the offset and another factor. The actual algorithm used may be refined into a more sophisticated calculation, i.e. including additional sources of data or empirically determining relationships between data sources mentioned herein, to insure perfect rice of any type anywhere in the world; this is done through empirical testing and taste tests. The boiling time is thus known, optionally timing out in five second intervals. After boiling time has elapsed, heaters are turned off, starch drain valve (SV44) is opened and a delay of drain time is taken, the drain time preferably being an interval of seven seconds. At this time, spray solenoid valve (SV34) is opened to commence spraying the rice. A is now taken to permit spraying and then draining of spray water into the bottom (starch water) chamber, the delay preferably being approximately 40 seconds. At this time, both solenoid valves are closed and the heaters are cycled on and off at a low duty cycle to reheat the rice and evaporate and/or enhance absorption of any excessive moisture on the surface of each grain of rice, thus completing the method of automatically cooking rice. Completion may optionally be indicated, preferably by having a green LED 9 turn off and having a red LED 10 turn on. In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

In an alternate embodiment, the rice cooker of this invention is modified to permit cooking rice in the conventional manner by using a reduced amount of water which is totally absorbed by the rice during cooking. The control program of microcomputer 52 is enhanced to detect the use of the conventional mode and to adjust the cooking time accordingly. The mode and further settings are entered by the user by using a selector device, such as, for example, modified dial 60 with fixed indicator 61 as shown in FIG. 7. While dial 60 is an analog selector device, it is assumed that other selector devices are applicable, such as push button or push screen digital selectors with digital or other indicating indicia. When an analog dial selector is used, such as low starch sector 62, it defines the low-starch mode shown with numeric indicia as well as second conventional sector 63 shown with alphabetic or other indicia, such as alphanumeric symbols, or universally acceptable International type symbols.

Figure 8:
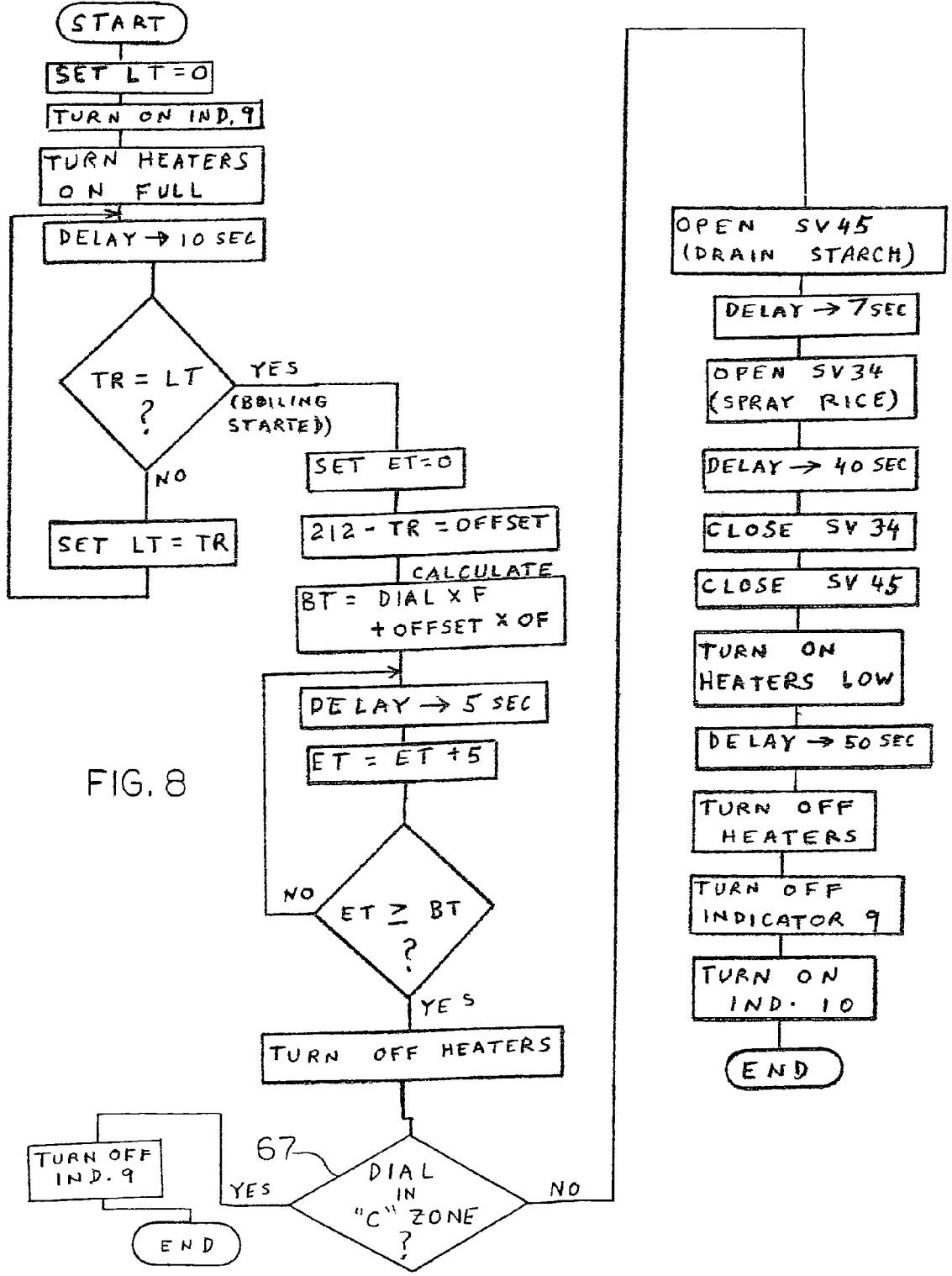
FIG. 8 is a Flow chart of rice cooker showing process modification to incorporate alternate embodiment feature of providing a conventional rice cooking mode.

The flow chart of FIG. 8 is a slight modification of that of the flow chart of FIG. 6 to show the addition of decision block 67, which truncates the process, after the rice is cooked, thereby bypassing the starch-reducing process steps, such as the rinsing of the rice. The boiling (or cooking) time calculation for "BT" will now pick up vastly different factors from the "conventional" dial or other selector setting, and the offset factor "OF" will also be a different value from that used for the "low-starch" process.

FIGS. 9 through 12 show the additional items and changes required to incorporate an agitation feature which is a second alternate embodiment. FIG. 9 shows an exploded view of embodiment 70 incorporating an agitator to shake the rice basket, such as, for example, agitator subassembly 74 and passive spring support subassemblies 82 mounted on pot housing 2 and supporting rice basket 71 from top rim 72.

In the detail of FIG. 10, the various components of subassembly 74 are shown; agitator 75 is attached to pot housing 2 rigidly via a fastening, such as a welded bracket 76. Rice basket rim is held in a resilient elastic state, so that it can be agitated. For example, support spring 77 is coiled over the output shaft of agitator element 75 which is attached to bracket 78 with inside lip 79 which supports rice basket rim 72. Preferably, agitator 75 is a voice-coil actuator which is operated intermittently by short bursts of low frequency alternating current as supplied by an electronic driver (not shown) and controlled by microcomputer 52. The intermittent operation is to insure that the agitation has the desired fluffing effect on the rice and not the opposite effect of compaction. Cover 3 is held away from moving bracket 78 by supports (not shown). Agitator 75 can also be implemented as a rotary motor driving an eccentric weight, or as a piezoelectric stack or bending transducer. Basket rim 72 is preferably supported at 120 degree intervals by agitator bracket 78 and two passive spring brackets 85 (as shown in FIG. 11). A spring, such as a stainless steel spring 84, is attached at one end to bracket 85 and at its bottom end to bracket 83 which is welded or otherwise attached to pot housing 2.

Figure 12:
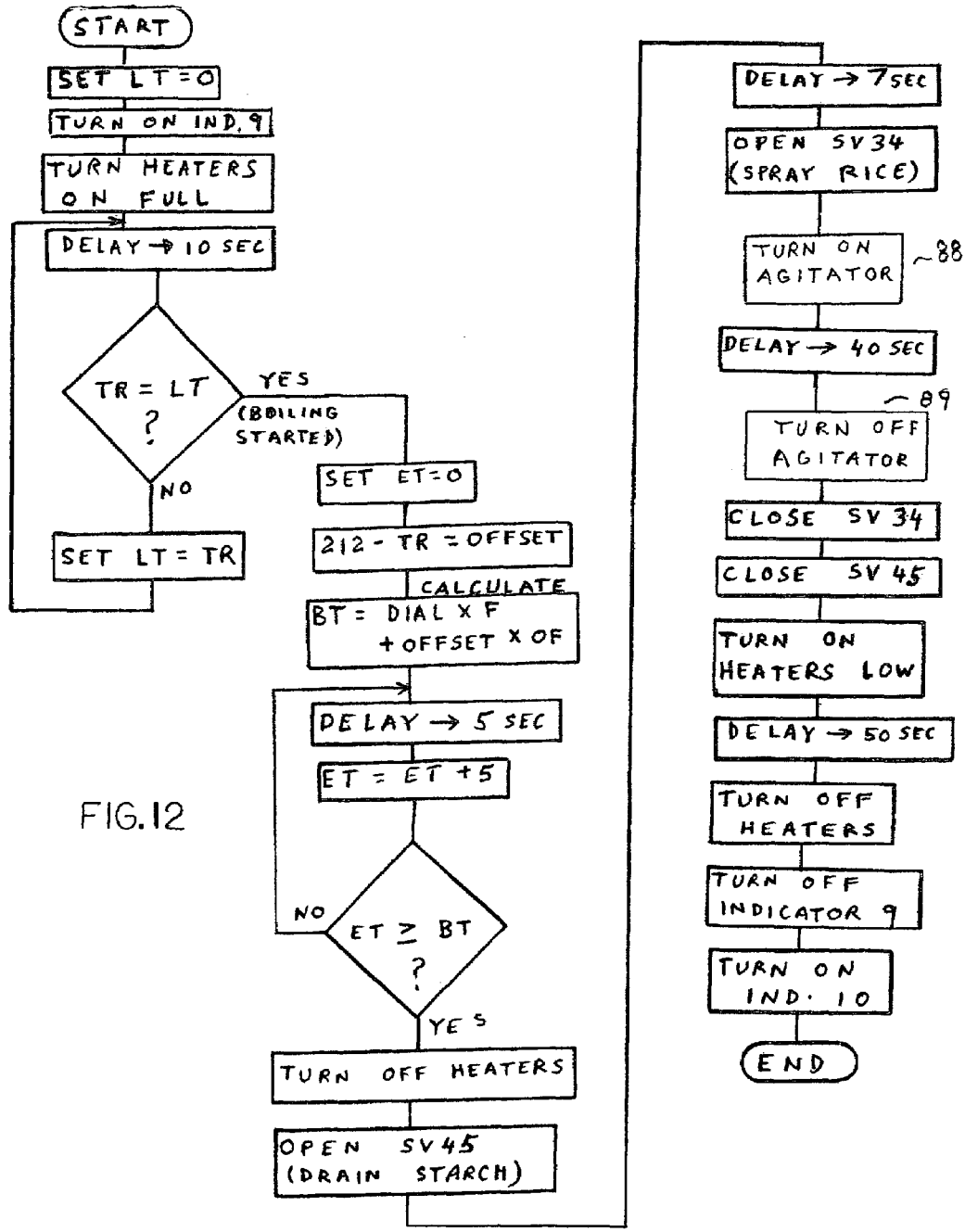

FIG. 12 is a flow chart that incorporates this agitating feature into the process as previously shown in FIG. 6. Note added blocks 88 and 89 which show the start of agitation when spraying is initiated and ending after the drain down period. During this period (shown as 40 seconds for example), the agitation is intermittent as discussed above; a preferable cycle is two second of continuous agitation every 5 seconds.

It is further known that other modifications may be made to the present invention, without departing the scope of the invention, as noted in the appended Claims.

We claim:

1. A starch-reducing rice cooker comprising:
   a pot comprising a lower compartment and an upper boiling chamber having a top opening;
   a partition separating said lower compartment from said upper boiling chamber;
   a perforated basket within said upper boiling chamber for containing rice to be cooked, said upper boiling chamber adapted to contain more than sufficient water to immerse said rice for cooking;
   a cover for said top opening, said cover having a means for spraying cool rinsing water onto said rice within said basket after cooking of said rice is complete;
   means, sandwiched within said partition, for heating the water within said upper boiling chamber to a boiling temperature;
   a discharge valve within said partition for communicating between said upper boiling water chamber and said lower compartment;
   means programmed to detect when boiling of water in said upper boiling temperature starts and maintain boiling for a time required to properly cook said rice based upon the boiling temperature at said water;
   means for activating said discharge valve after cooking is completed for discharging water through said discharge valve from said upper boiling chamber into said lower compartment.

2. The rice cooker of claim 1 wherein said means programmed to detect when boiling of water starts comprises a temperature sensor immersed in the water, said temperature sensor detecting current temperature, said means further comprising a microcomputer comparing said current temperature to previous temperature.

3. The rice cooker of claim 1, wherein said spraying means in said cover comprises a reservoir having said cool rinsing water, means for pressurizing said rinsing water within said reservoir, and a spray valve upon actuation for spraying said rinsing water onto said rice in said upper boiling chamber.

4. The rice cooker of claim 3 in which said spray valve is solenoid actuated.

5. The rice cooker of claim 4 having a housing mounted on said pot for delivering electrical power to said heating means within said partition.

6. The rice cooker of claim 5 in which said housing is connected to a source of AC electric power and said housing comprises a means for delivering said AC electric power to said heating means and convert AC electric power to low voltage electricity for operation of said solenoid actuated valves and said programmed means.

7. The rice cooker of claim 6 in which said cover and pot have electrical connectors which engage when said cover is in place on said pot for delivering electrical power to the solenoid actuated valve in said cover.

8. The rice cooker of claim 1 having an onboard computer for automating the operation of said means for heating said water and the solenoid actuated valves, and a dial operated input for setting cooking length dependent upon the type of rice being cooked, the amount of rice being prepared and user preference.

9. The rice cooker of claim 1 further comprising a means of selecting between at least two levels of starch content.

10. The rice cooker of claim 9 wherein said means of selecting comprises a rotary dial having numeric or alphabetic indicia representing levels of starch content.

11. The rice cooker of claim 9 wherein said means of selecting comprises a digital selector having numeric or alphabetic indicia representing levels of starch content.

12. The rice cooker of claim 9 wherein at least one selectable level of starch content triggers the de-activation of said means for activating said discharge valve.

13. The rice cooker of claim 1 further comprising a means of agitating said perforated basket in said upper portion, said means of agitating comprising at least one agitator.

14. The rice cooker of claim 13 wherein said means of agitating contacts an outer surface portion of said upper portion of said pot and straddles the lip portion of said upper portion of said pot receiving a portion of a rim of said perforated basket.

15. The rice cooker of claim 14 wherein said at least one agitator contacts said outer surface portion with at least one welded bracket.

16. The rice cooker of claim 13 wherein said at least one agitator comprises a voice-coil actuator.

17. The rice cooker of claim 13 wherein said at least one agitator is chosen from the group consisting of a voice-coil actuator, a rotary motor driving an eccentric weight, a piezoelectric stack, or a bending transducer.

18. The rice cooker of claim 13 wherein said at least one agitator comprises three agitators, each said agitator being spaced approximately 120 degrees about the circumference of said perforated basket.

19. The rice cooker of claim 13, wherein said at least one agitator further comprises at least one passive spring.

20. The rice cooker of claim 13, wherein said means of agitating operates for approximately 2 seconds at intervals of approximately 5 seconds.

21. A starch-reducing rice cooker comprising:
a pot comprising a lower compartment and an upper boiling chamber having a top opening;
a partition separating said lower compartment from said upper boiling chamber;
a perforated basket within said upper boiling chamber for containing rice to be cooked, said upper boiling chamber adapted to contain more than sufficient water to immerse said rice for cooking;
a cover for said top opening;
means, sandwiched within said partition, for heating the water within said upper boiling chamber to a boiling temperature;
a discharge valve within said partition for communicating between said upper boiling water chamber and said lower compartment;
means programmed to detect when boiling of water in said upper boiling temperature starts and maintain boiling for a time required to properly cook said rice based upon the boiling temperature of said water;
means for activating said discharge valve after cooking is completed for discharging water through said discharge valve from said upper boiling chamber into said lower compartment.

22. The rice cooker of claim 21 wherein said means programmed to detect when boiling of water starts comprises a temperature sensor immersed in the water, said temperature sensor detecting current temperature, said means further comprising a microcomputer comparing said current temperature to previous temperature.

23. The rice cooker of claim 21 having an onboard computer for automating the operation of said means for heating said water, and a dial operated input for setting cooking length dependent upon the type of rice being cooked, the amount of rice being prepared and user preference.

24. The rice cooker of claim 21 further comprising a means of agitating said perforated basket in said upper portion, said means of agitating comprising at least one agitator.

25. The rice cooker of claim 24 wherein said means of agitating contacts an outer surface portion of said upper portion of said pot and straddles the lip portion of said upper portion of said pot receiving a portion of a rim of said perforated basket.

26. The rice cooker of claim 24 wherein said at least one agitator contacts said outer surface portion with at least one welded bracket.

27. The rice cooker of claim 24 wherein said at least one agitator comprises a voice-coil actuator.

28. The rice cooker of claim 24 wherein said at least one agitator is chosen from the group consisting of a voice-coil actuator, a rotary motor driving an eccentric weight, a piezoelectric stack, or a bending transducer.

29. The rice cooker of claim 24 wherein said at least one agitator comprises three agitators, each said agitator being spaced approximately 120 degrees about the circumference of said perforated basket.

30. The rice cooker of claim 24, wherein said at least one agitator further comprises at least one passive spring.

31. The rice cooker of claim 24, wherein said means of agitating operates for approximately 2 seconds at intervals of approximately 5 seconds.

* * * * *